United States Patent [19]

Furuno et al.

[11] Patent Number: 4,514,551

[45] Date of Patent: Apr. 30, 1985

[54] PROCESS FOR THE PREPARATION OF CATIONIC POLYMERS

[75] Inventors: Akihisa Furuno, Yokohama; Kenichi Inukai, Ohtake; Yasuo Ogawa, Kawasaki, all of Japan

[73] Assignees: Nitto Chemical Industry Co., Ltd.; Mitsubishi Rayon Co., Ltd.; Diafloc Co., Ltd., all of Tokyo, Japan

[21] Appl. No.: 572,753

[22] Filed: Jan. 23, 1984

[30] Foreign Application Priority Data

Jan. 24, 1983 [JP] Japan .................................. 58-8799

[51] Int. Cl.³ .............................................. C08F 2/38
[52] U.S. Cl. .................................. 526/233; 526/307; 526/307.2; 526/312
[58] Field of Search .............................. 526/193, 233

[56] References Cited

U.S. PATENT DOCUMENTS

| | | | |
|---|---|---|---|
| 3,912,607 | 10/1975 | Communal | 204/159.23 |
| 4,138,589 | 2/1979 | Kawakami | 526/229 |
| 4,306,048 | 12/1981 | Yoshida et al. | 526/193 |
| 4,329,441 | 5/1982 | Bergthaller | 526/193 |

FOREIGN PATENT DOCUMENTS 54-39435 11/1979 Japan .
55-11684  3/1980 Japan .
5353566  12/1981 Japan .

Primary Examiner—Christopher A. Henderson
Attorney, Agent, or Firm—Cushman, Darby & Cushman

[57] ABSTRACT

A process for preparing a cationic polymer which comprises polymerizing a monomer mixture containing acrylamide and a cationic alkenyl monomer represented by the general formula:

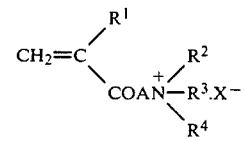

wherein $R^1$ represents H or $CH_3$; $R^2$ and $R^3$ represent independently $CH_3$ or $C_2H_5$; $R^4$ represents H, $CH_3$, $C_2H_5$ or a benzyl group; A represents $-OC_nH_{2n}-$ (wherein n=2 or 3),

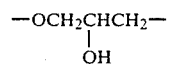

or $-NC_nH_{2n}-$ (wherein n=2 or 3); and $X^-$ represents $Cl^-$, $Br^-$, $I^-$, $CH_3SO_4^-$, $C_2H_5SO_4^-$, $\frac{1}{2}SO_4^{--}$ or $CH_3COO^-$, in the form of a sheet in an aqueous medium, characterized in that the composition ratio of acrylamide/cationic alkenyl monomer is within the range of 95/5 to 5/95, and the polymerization is carried out in the presence of a phosphite. The polymers obtained according to this process are free from insolubles produced under the influence of oxygen.

10 Claims, No Drawings

PROCESS FOR THE PREPARATION OF CATIONIC POLYMERS

Copolymers of acrylamide and a cationic alkenyl monomer represented by the general formula (I):

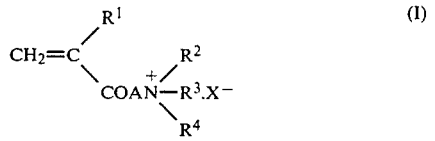

wherein $R^1$ represents H or $CH_3$; $R^2$ and $R^3$ represent independently $CH_3$ or $C_2H_5$; $R^4$ represents H, $CH_3$, $C_2H_5$ or a benzyl group; A represents $-OC_nH_{2n}-$ (wherein n is 2 or 3),

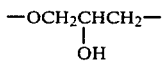

or $-NC_nH_{2n}-$ (wherein n is 2 or 3); and $X^-$ represents $Cl^-$, $Br^-$, $I^-$, $CH_3SO_4^-$, $C_2H_5SO_4^-$, $\frac{1}{2}SO_4^{--}$ or $CH_3COO^{-1}$) are water-soluble synthetic high-molecular substances which have come to be used widely in recent years as a clearifier or dehydrating adjuvant in the treatment of waste water, or as a paper strength improver, or a filler retention aid in the paper making industry. Especially, cationic polymers are a substantially indispensable adjuvant for centrifugal dehydration or filtration-dehydration of municipal sewage sludge, and in this field, the above-said copolymers are most widely used. The reasons therefor include the followings: these types of copolymers are obtainable with a wide variety of "cationic degree" (cationic group content) by changing the copolymerization ratio of the reactants; it is also possible to obtain these copolymers with a relatively high molecular weight which can be adjusted as desired, so that a polymer can be obtained which is best suited for the treatment of the particular type of sludge to be dehydrated.

Many methods have been proposed for the preparation of compolymers of acrylamide and cationic alkenyl monomers of the general formula (I), such methods including inverse suspension polymerization or inverse emulsion polymerization of an aqueous solution of a monomer mixture in an oily medium and precipitation polymerization in a lower alcohol. Lately, however, polymerization of monomers in an aqueous medium has become most conventional in the preparation of said copolymers. This is probably due to the fact that the polymerization in an aqueous medium has the least possibility of causing chain transfer and hence is suited for forming a high-molecular weight substance, that the use of an aqueous medium is free from the danger involved in the treatment of an oily medium, and that this type of polymerization is economically advantageous.

These polymers are today commercially sold mostly as a dry powder for the reasons of transportation cost, solubility and other advantages. For drying a polymer obtained by polymerization in an aqueous medium, it is, of course, expedient to increase the monomer concentration at the time of polymerization. However, because the polymerization reaction is exothermic, external cooling is required for increasing the monomer concentration above a certain level. For this purpose, a method has been proposed in which a monomer solution is spread in a thickness of from several millimeters to several tens of millimeters on a metal sheet and is polymerized in the so-called sheet form with cooling from underside. This system, in its industrial application, makes it possible to carry out continuous polymerization reactions on a stainless steel belt conveyor to provide many advantages such as improved productivity, stabilized product quality, etc. Such polymerization of acrylamide and/or monomers of the general formula (I) on a continuous belt is exemplified in U.S. Pat. No. 4,138,539 and U.S. Pat. No. 3,912,607. The former patent has been proposed as a polymerization method using an initiator, and the latter patent as an ultraviolet irradiation polymerization method. Also, a method of polymerizing a monomer solution in a bag or tube made of a plastic film is proposed in Japanese Patent Publication No. 53,566/81.

In industrial polymerization of these monomers in an aqueous medium on a belt, usually a large volume of nitrogen gas is allowed to flow over the reaction system, but actually a small amount of oxygen is inevitably incorporated. An examination of the effect of such a small amount of oxygen in the gaseous phase has revealed that if the supplied monomer solution is sufficiently freed from oxygen, no delay or imperfection of polymerization as a whole occurs, but the polymer of the surface portion, that is, the portion contacted with the gaseous phase, becomes poor in solubility.

A closer study of this insolubilization phenomenon has revealed that the solubility of the central portion of the polymer in the thicknesswise direction of the sheet is not affected and the polymer in only a several-mm thick portion of the surface of the sheet, which portion is contacted with the gaseous phase, becomes poor in solubility, but such insolubilization of the surface portion does not occur if the gaseous phase is sufficiently purged with a high-purity nitrogen gas. These facts indicate that the presence of oxygen is responsible for the insolubilization of the surface portion of the polymer and the oxygen amount in question in the space above the sheet would be 20 ppm to several thousands of ppm. An oxygen concentration of less than 20 ppm signifies the highest purity nitrogen of the conventionally used nitrogen, and under such an atmosphere, the insolubilization of the surface portion does not become any problem as discussed above. If the oxygen concentration becomes higher than 1%, there arises difficulties of a different nature from insolubilization, such as delayed polymerization of the surface portion and an increase of amount of the unreacted monomer, although the situation can vary depending on the monomer composition and the amount of the initiator used.

The copolymers of acrylamide and the monomers of the general formula (I), as in the case of general high polymer flocculating agents, have a tendency that usually the higher the molecular weight, the better the flocculating performance, but on the other hand, an excessively long time is required for dissolving the power product and the undissolved matter can be left even after a long-time dissolving treatment. However, said insolubilization of the surface portion is often caused even in the case of the low-molecular weight polymers.

The present inventors have conducted a more extensive study for preventing such a phenomenon of insolubilization due to oxygen and for obtaining a polymer of high quality stably even when oxygen is present in the gaseous phase in an amount of about 20 ppm to several thousands of ppm, which is inevitable in the industrial practice of polymerization, and as a result, have found that in case of using water-soluble mercaptans, lower secondary alcohols, amines or the like which are usually employed as a chain transfer agent for the polymerization in an aqueous medium for adjusting the molecular weight of the high-molecular weight polymer to be produced and improving its solubility, there is seen a tendency toward insolubilization of the polymer of the surface portion due to oxygen. However, when a phosphite such as sodium phosphite is used in place of said known types of chain transfer agents, said phenomenon of insolubilization does not occur, and even if occurs, the degree of such phenomenon is relatively slight or almost insignificant, and this finding has enabled the attainment of said object of the invention.

Thus, according to this invention, there is provided a process for producing a cationic polymer which comprises polymerizing a monomer mixture containing acrylamide and a cationic alkenyl monomer of the general formula (I) in the form of a sheet in an aqueous medium, characterized in that the composition ratio of acrylamide/cationic alkenyl monomer is within the range of 95/5 to 5/95 and the polymerization is carried out in the presence of a phosphite.

The composition ratio by weight of acrylamide/cationic alkenyl monomer of the general formula (I) in this invention is defined to fall within the range of 95/5 to 5/95, but if necessary, other monomer or monomers copolymerizable with said cationic alkenyl monomer may be mixed in an amount not greater than 25% by weight of the weight of the whole monomer mixture.

However, if said composition ratio is less than 5/95 and said cationic alkenyl monomer occupies most of the monomer mixture, the insolubilization per se of the polymer at the surface portion does not occur even if oxygen is present in a fairly high concentration in said gaseous phase, so that in such a case, there is actually no need for use of a phosphite. On the other hand, if said composition ratio exceeds 95/5 and hence, most of the monomer mixture is occupied by acrylamide, the influence of oxygen becomes too strong to prevent insolubilization of the polymer at the surface portion even if a phosphite is used. Accordingly, the monomer composition ratio in which the use of a phosphite is effective is in the above-defined range, and a range from 90/10 to 30/70 is particularly effective.

The cationic alkenyl monomers represented by the general formula (I) include sulfates and hydrochlorides of dimethylaminoethyl (meth)acrylate, diethylaminoethyl (meth)acrylate, 3-(dimethylamino)-2-hydroxypropyl (meth)acrylate, 3-(diethylamino)-2-hydroxypropyl (meth)acrylate, etc., and the quaternized products of these monomers with alkyl halides, benzyl chloride, dimethylsulfuric acid, diethylsulfuric acid or the like.

As the monomers copolymerizable with these monomers and acrylamide, there may be used those alkenyl monomers which are soluble in water, such as methyl acrylate, acrylonitrile, hydroxyethyl methacrylate and the like.

The phosphites usable in this invention include sodium phosphite, potassium phosphite, ammonium phosphite and the like, and these phosphites may be used either alone or in combination.

The chain transfer action of phosphites has still not been well-known, but its action as a transfer agent varies depending upon the pH, that is, such action is weak on the acidic side and strong on the alkaline side.

For instance, in the case of methacryloyloxyethyltrimethylammonium chloride, which is one of the typical examples of the monomers represented by the general formula (I), and is formed by quaternizing dimethylaminoethyl methacrylate with methyl chloride, the ester groups are hydrolyzed slowly on an alkaline side, so that the polymerization reaction of a monomer mixture containing this type of monomer is usually carried out on an acidic side. In the case of polymerization on such an acidic side, the phosphite is added usually in an amount of about 100 to 10,000 ppm based on the monomer, but in the case of polymerization on an alkaline side, a satisfactory chain transfer action is shown at a concentration of 1/10 to 1/100 of the amount of phosphite required in the case of the acidic side polymerization.

As mentioned above, when using a water-soluble mercaptan such as $\beta$-mercaptopropionic acid or mercaptoethanol or a secondary alcohol such as sec-butanol or iso-propanol as a chain transfer agent, a tendency is seen that the polymer of the surface portion alone is insolubilized in polymerization in the form of a sheet, resulting in a product with a poor solubility. In contrast thereto, in case of using a phosphite such as sodium phosphite or potassium phosphite, the difference in solubility between the polymer of the surface portion and the polymer of the central portion of the sheet, even if the polymer has a high-molecular weight, does not appear so greatly as in the case of using a water-soluble mercaptan or the like.

The cause of the difference due to the type of chain transfer agent used remains unknown, but said local insolubilization of polymer in the surface portion is considered to be because the presence of oxygen under the radical-forming conditions in the course of polymerization has enabled a very slight amount of cross-linkage to be formed between the polymers. Therefore, it is considered that a phosphite prevents in some manner the reactive species produced by the action of oxygen or by the reaction of radical and oxygen from being cross-linked. The facts that the surface insolubilization due to oxygen occurs in the course of polymerization and that the insolubilization inhibitory action of the phosphite is exercised not during drying of the gel but during polymerization can be confirmed by dissolving the gel immediately after the polymerization and observing its solubility.

When the term "polymerization in the form of a sheet" is used herein, it means a style of polymerization in which a monomer solution is spread on a fixed or movable support and polymerized in this form. This spread layer of the monomer solution is usually a film as very thin as around 1 mm, or may be as thick as several tens of millimeters or more. It should be noted, however, that such a style of polymerization is employed in this invention for making the external cooling or light irradiation efficient. For actual practice of polymerization in accordance with this invention, the thickness of the monomer solution layer is usually within the range of from 3 to 50 mm.

For industrial practice of the polymerization in the form of a sheet there is usually used a method comprising polymerizing the monomers on a continuously moving belt under a nitrogen atmosphere (see aforementioned U.S. Pat. No. 4,138,539 and U.S. Pat. No. 3,912,607), but it is also possible to use a method in which the monomer solution is spread in a vat-like container in the form of a sheet, and the upper space of the container is covered with nitrogen or a method in which the monomer solution is placed in a plastic bag or tube and polymerized therein (see aforementioned Japanese Patent Publication No. 53,566/81).

In these methods, no partial insolubilization of polymer occurs when a phosphite is used as a chain transfer agent, even if the nitrogen substitution for the polymerization atmosphere is imperfect. Thin plastic films are inexpensive and disposable, but many of them are oxygen-permeable. Even with such thin films, it is possible to obtain a polymer with a good solubility when the polymerization is carried out according to the method of this invention using a phosphite.

As to the polymerization recipe to be used in accordance with this invention, the overall monomer concentration is not critical, but since an object of the polymerization in the form of a sheet is the elevation of monomer concentration, it is recommended to carry out the polymerization at a monomer concentration of around 30% by weight or more. The upper limit of the overall monomer concentration may be varied depending upon the monomer solubility, and it will be around 90% at most. In case of using commercially available aqueous monomer solution, the preferred range of monomer concentration is from 50 to 87% by weight.

As the polymerization initiating species, that is, as the radical-generating source, one may use the ordinary initiators such as azo compounds or redox type initiators which are usable with an aqueous system, or other various sources of radical formation such as light irradiation. In the case of photopolymerization, usually a photosensitizer such as a benzoin alkyl ether or an azo compound is added.

In the photopolymerization, it is an almost essential condition to spread the monomer solution in the form of a sheet, so that the contact area between monomer layer and oxygen becomes great. In such a case, therefore, the use of the method of this invention proves very effective.

The process of this invention will be described in further detail below referring to the Examples.

In the Examples, as a measure of the molecular weight of the polymer produced, the viscosity of the solution containing 1% of the polymer in a 0.2 N NaCl solution was measured by a Brookfield viscometer and this was expressed as 1% $\theta_{NaCl}$ (rotor No. 1 was used for the viscocity of not more than 1,000 cps, and rotor No. 2 used for the viscosity of more than 1,000 cps; and revolution speed: 6 r.p.m.). The insoluble gel portion of the polymer was measured in the following manner: A hydrous gel of the polymer was cut to 2-3 mm cube with scissors (or its dry powder obtained by drying said gel overnight at 60° C. by means of a hot air dryer and pulverizing it into powder) and added to pure water with stirring at 240 r.p.m. so that no undissolved lumps were formed, the resulting mixture was stirred for 4 hours to form a 0.1% solution, and 500 cc of this solution was poured onto a 80 mesh sieve. The surface of the sieve was washed well with water and the sieve as it was wet was weighed, and the number of grams was given as the content of insoluble matter.

Also, in the following Examples, the amounts of the initiator, chain transfer agent, etc., added were the proportions thereof to the whole solution to be subjected to polymerization.

EXAMPLE 1

In about 900 cc of pure water was dissolved 500 g of each of acrylamide crystals and methacrylolyoxyethyltrimethylammonium chloride crystals. Then precisely weighed 0.2 g of benzoin ethyl ether was added thereto and dissolved by sufficient stirring. To the resulting solution was added a small amount of dilute sulfuric acid to adjust the pH of the solution to 3.5, followed by further addition of a small quantity of pure water to make the overall amount of the solution 2,000 g. This solution was equally divided into four portions and each portion (500 g) was put into a conical flask, and a chain transfer agent shown in Table 1 was added thereto. The oxygen dissolved in the solution was replaced sufficiently with high-purity nitrogen gas.

Separately a stainless steel vat having internal dimensions of about 40 cm × 25 cm and a depth of 5 cm interiorly partitioned into four sections was prepared. Each section of the vat was provided with a monomer inlet tube and an opening for inserting the thermosensor of a temperature recorder. The top of the vat was sealed with a glass plate through a rubber packing while the lower part of the vat was immersed in a water bath of a constant temperature of 30° C. A mixed gas of $N_2$ and $O_2$ ($N_2/O_2 = 99.9/0.1$ by volume) was allowed to flow in the vat at a rate of 500 cc/min for a period of more than one hour to effect sufficient replacement of the inside gas in the vat and then the above-said monomer solution was supplied to each section in the vat through a rubber tube in such a way that said solution was not be contacted with the ambient air. The depth of the solution in the vat was about 20 mm. Then a 20 w black light (low pressure mercury lamp) set at a position 120 cm above the vat was lighted to effect ultraviolet irradiation with an incident light intensity of about 1 W/m² at the light-receiving plane. After an induction period of about 10 minutes, the temperature of the monomer solution began to rise, and 52 minutes thereafter, it reached the peak temperature of 67° C. During this period, said mixed gas containing 0.1% of $O_2$ was allowed to flow in the gaseous phase of the vat.

After the internal temperature of the vat dropped to not more than 40° C., the glass plate was moved and the produced hydrous polymer gel was taken out. The surface layer (the surface contacted with the gaseous phase) of the gel and its central portion were sampled separately, each in a thickness of 2-3 mm. Each sample was cut to a size of 2-3 mm cube with scissors and dissolved in water, and the weight of insoluble gel and the viscosity of the solution were measured.

A similar experiment was conducted for the case where a high-purity nitrogen gas (with a purity of 99.998% or more) was used as the polymerization atmosphere (Referential Examples).

The results obtained were as shown in Table 1.

TABLE 1

| | Run No. | Chain transfer agent Type | Amount added (ppm) | 1% $\eta_{NaCl}$ (cps) | Insolubles (g) Surface portion | Central portion |
|---|---|---|---|---|---|---|
| Example | 1-1 | Sodium phosphite | 1250 | 900 | 0 | 0 |

TABLE 1-continued

|  | Run No. | Chain transfer agent | | 1% $\eta_{NaCl}$ (cps) | Insolubles (g) | |
|---|---|---|---|---|---|---|
|  |  | Type | Amount added (ppm) |  | Surface portion | Central portion |
|  | 1-2 | Sodium phosphite (Na$_2$HPO$_3$.5H$_2$O) | 1550 | 770 | 0 | 0 |
|  | 1-3 | Sodium phosphite (Na$_2$HPO$_3$.5H$_2$O) | 1900 | 670 | 0 | 0 |
|  | 1-4 | Sodium phosphite (Na$_2$HPO$_3$.5H$_2$O) | 2500 | 430 | 0 | 0 |
| Comparative Example | 1-5 | β-Mercaptopropionic acid | 6 | 830 | 120 | 0 |
|  | 1-6 | β-Mercaptopropionic acid | 7.5 | 670 | 12 | 0 |
|  | 1-7 | sec-Butanol | 3500 | 730 | 77 | 2 |
|  | 1-8 | sec-Butanol | 6000 | 500 | 23 | 1 |
| Referential Example | 1-9 | β-Mercaptopropionic acid | 6 | 850 | 8 | 0 |
|  | 1-10 | β-Mercaptopropionic acid | 7.5 | 680 | 0 | 0 |
|  | 1-11 | sec-Butanol | 3500 | 760 | 5 | 0 |
|  | 1-12 | sec-Butanol | 6000 | 480 | 0 | 0 |

Note:
The polymerization was conducted in an N$_2$/O$_2$ = 99.9/0.1 (vol %) atmosphere in the Examples and Comparative Examples and in a high-purity N$_2$ atmosphere in the Referential Examples.

As seen from the results given in Table 1, in the polymerization in an atmosphere containing a small quantity of oxygen, using a water-soluble mercaptan or an alcohol, the central portion of the polymer shows a good solubility, but the surface portion thereof is insolubilized and the higher the molecular weight of the polymer, the higher the degree of insolubilization. In the system having added thereto sodium phosphite, however, no insolubilization takes place in the surface portion even when 1% $\theta_{NaCl}$ is as high as 900 cps.

When the polymerization is conducted in a high-purity nitrogen atmosphere as in the case of the Referential Examples, the surface insolubilization is not conspicuous even when using a mercaptan or an alcohol as a chain transfer agent.

EXAMPLE 2

In the same way as in Example 1, 2,000 g of a solution of an acrylamide and methacryloyloxyethyltrimethylammonium chloride in a weight ratio of 50/50 and an overall monomer concentration of 50% by weight was prepared. In this case, however, 0.2 g of 2,2'-azobis(2-amidinopropane) hydrochloride was dissolved in place of the benzoin ethyl ether as the initiator. This solution was equally divided into four portions and each portion (500 g) was put into a conical flask, and a chain transfer agent shown in Table 2 was added thereto, after which the solution was de-oxygenated by blowing high-purity nitrogen gas into the flask.

Separately, the same stainless steel vat as used in Example 1, which was interiorly partitioned into four sections, was immersed in a hot water bath at 50° C., and the top thereof was covered with glass. A 99.9:0.1 (by volume) gas mixture of N$_2$ and O$_2$ was allowed to flow in the vat at a rate of 500 cc/min for one hour to effect sufficient substitution for the interior gas. Each section of the vat was connected to the conical flask through a rubber tube and 500 cc of a de-oxygenated monomer solution was fed to each section so that the depth of the monomer solution in each section became about 20 mm.

After the internal temperature of the monomer solution reached 50° C. and some induction time passed thereafter, the temperature began to rise and reached a peak temperature of 100°–105° C. in about 40 minutes. After the inside temperature of the flask was cooled down near room temperature, the produced gel-like polymer was taken out. Then, in the same manner as in Example 1, the polymer was cut with scissors to sample the surface and central portions of the polymer separately. The sample in the gel form was dissolved, and the weight of insoluble gel portion of each sample and the solution viscosity 1% $\theta_{NaCl}$ were measured to obtain the results shown in Table 2.

TABLE 2

|  | Run No. | Chain transfer agent | | 1% $\eta_{NaCl}$ (cps) | Insolubles (g) | |
|---|---|---|---|---|---|---|
|  |  | Type | Amount added (ppm) |  | Surface portion | Central portion |
| Example | 2-1 | Sodium phosphite | 480 | 380 | 5 | 3 |
|  | 2-2 | Sodium phosphite | 720 | 250 | 0 | 0 |
| Comparative Example | 2-3 | β-Mercaptoethanol | 10 | 320 | 90 | 8 |
|  | 2-4 | β-Mercaptoethanol | 16 | 220 | 33 | 0 |
|  | 2-5 | iso-Propanol | 2500 | 250 | 25 | 7 |

EXAMPLE 3

Photopolymerization was conducted using the same vat in the same manner as in Example 1. In this case, however, a monomer solution of an 80/20 (by weight) acrylamide/methacryloyloxyethyltrimethylammonium chloride mixture having an overall monomer concentration of 32% by weight was prepared. To the solution was added 100 ppm of benzoin ethyl ether and the pH was adjusted to 3.5. The bath temperature was 30° C.

The monomer solution was de-oxygenated with a high-purity nitrogen gas and a mixed gas of N$_2$/O$_2$=99.9/0.1 (by volume) was allowed to flow in the stainless steel vat. The polymerization was conducted using the types and amounts of chain transfer agents shown in Table 3 to obtain the results shown in Table 3.

TABLE 3

| | Run No. | Chain transfer agent Type | Amount added (ppm) | 1% $\eta_{NaCl}$ (cps) | Insolubles (g) Surface portion | Central portion |
|---|---|---|---|---|---|---|
| Example | 3-1 | Sodium phosphite | 600 | 1320 | 0 | 3 |
| | 3-2 | Sodium phosphite | 1000 | 910 | 0 | 0 |
| Comparative Example | 3-3 | β-Mercaptopropionic acid | 2.8 | 1350 | 36 | 0 |
| | 3-4 | iso-Propanol | 1000 | 1120 | 15 | 0 |

EXAMPLE 4

With about 400 g of pure water was mixed 381.1 g of dimethylaminoethyl methacrylate, and concentrated sulfuric acid was dropwise added to the resulting mixture with external cooling to neutralize the mixture until the solution became substantially neutral. To the mixture was added 1,000 g of a commercially available 50% by weight aqueous acrylamide solution, followed by further addition of 0.2 g of benzoin ethyl ether crystals, after which the mixture was stirred well to form a solution. Then, a small amount of dilute sulfuric acid was added dropwise thereto to adjust the pH of the solution to 3.5, and then pure water was added to make the overall amount of the solution 2,000 g.

The thus prepared monomer solution was equally divided into four portions, and to each portion was added a chain transfer agent as shown in Table 4. The portion was de-oxygenated in the same manner as in Example 3 and poured into the stainless steel vat in which a 99.9/0.1 (by volume) $N_2/O_2$ mixed gas flowed. The reaction started about 10 minutes after commencement of 1 W/m² ultraviolet irradiation and the peak temperature of 63° C. was reached after 52 minutes (bath temperature =30° C.).

The surface and central portions of the thus produced polymer gel were sampled separately, cut into pieces of 2-3 mm cube with scissors, dried overnight by a hot air dryer at 60° C. and pulverized into 0.3-1.5 mm powder by a pulverizer. The physical properties and the weight of insoluble gel portion of this powder were as shown in Table 4.

EXAMPLE 5

An approximately 15 cm square bag was made with a propylene food packaging sheet having a thickness of 40 μ, and 600 g of a monomer solution prepared in the same manner as in Example 1, except that the chain transfer agent was replaced by another was supplied to said bag. This bag was sandwiched between two polymethyl methacrylate (organic glass) plates having many holes, and the assembly was stood on end. The thickness of the bag was fixed to about 20 mm. A nitrogen gas blowing pipe and a thermosensor of a temperature recorder were inserted into the bag from its top and the bag was heat-sealed. The contact points of the nitrogen gas-blowing pipe and the thermosensor with the bag were fastened with a rubber string.

The whole assembly was stood in a glass-made tank filled with water at 30° C. A high-purity nitrogen gas was blown into the bag sufficiently to effect deoxygenation of the inside of the bag and then 1 W/m² ultraviolet rays were applied thereto from the side using a black light to perform polymerization.

Two types of chain transfer agents were used. The results obtained were as shown in Table 5. The induction period was reduced to about 5 minutes by applying intensified irradiation initially. A period of approximately 55 minutes was required until the peak temperature was reached in both cases. The peak temperature was 58° C.

Poor solubility of the portion contacted with the film in case of using β-mercaptopropionic acid is due to permeation of oxygen through the film from the cooling water side.

TABLE 5

| | Run No. | Chain transfer agent Type | Amount added (ppm) | Sampling position | 1% $\eta_{NaCl}$ (cps) | Insolubles (g) |
|---|---|---|---|---|---|---|
| Example | 5-1 | Sodium phosphite | 1500 | Surface | 530 | 0 |
| | | | | Center | 610 | 0 |
| Comparative Example | 5-2 | β-Mercaptopropionic acid | 10 | Surface | 600 | 73 |
| | | | | Center | 690 | 7 |

EXAMPLE 6

The pH of an aqueous solution containing 500 g of a diethylsulfuric acid-quarternized product of dimethyl-

TABLE 4

| | Run No. | Chain transfer agent Type | Amount added (ppm) | 1% $\eta_{NaCl}$ (cps) | Insolubles (g) Surface portion | Central portion |
|---|---|---|---|---|---|---|
| Example | 4-1 | Sodium phosphite | 800 | 910 | 0 | 0 |
| | 4-2 | Sodium phosphite | 1000 | 750 | 0 | 0 |
| Comparative Example | 4-3 | β-Mercaptopropionic acid | 4.5 | 730 | 53 | 0 |
| | 4-4 | β-Mercaptopropionic acid | 6 | 580 | 15 | 0 | aminoethyl methacrylate and 500 g of acrylamide was adjusted to 3.5, and the overall amount of the solution was made 2,000 g. To the solution was added 0.2 g of 2,2′-azobis(2-amidinopropane) hydrochloride to dissolve the latter in the former, and the resulting solution was equally divided into four portions, each of which was placed in an Erlenmeyer flask.

One of the chain transfer agents shown in Table 6 was added in the amount shown in Table 6 to one of the four portions, and the resulting mixture was subjected to polymerization under the same conditions as in Example 2 in a nitrogen gas atmosphere having a ratio of $N_2/O_2=99.9/0.1$ (by volume).

The results obtained are shown in Table 6. It is clear from the results that when water-soluble phosphites are used, the remarkable insolubilization of the surface portion as seen in the Comparative Example (Run No. 6-4) does not take place.

TABLE 6

|  | Run No. | Chain transfer agent Type | Amount (ppm) | 1% $\eta_{NaCl}$ (cps) | Insolubles (g) Surface portion | Central portion |
|---|---|---|---|---|---|---|
| Examples | 6-1 | Potassium phosphite (K$_2$HPO$_3$) | 350 | 390 | 1 | 0 |
|  | 6-2 | Ammonium phosphite ((NH$_4$)$_2$HPO$_3$.H$_2$O) | 350 | 360 | 0 | 0 |
|  | 6-3 | Magnesium phosphite (MgHPO$_3$.3H$_2$O) | 350 | 350 | 5 | 3 |
| Comp. Example | 6-4 | β-Mercaptoethanol | 10 | 300 | 70 | 6 |

What is claimed is:

1. In a process for producing a cationic polymer by polymerizing a monomer mixture containing acrylamide and a cationic alkenyl monomer represented by the general formula (I):

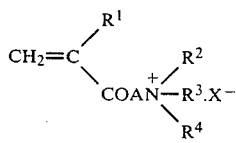

wherein $R^1$ represents H or CH$_3$; $R^2$ and $R^3$ represent independently CH$_3$ or C$_2$H$_5$; $R^4$ represents H, CH$_3$, C$_2$H$_5$ or benzyl, A represents —OC$_n$H$_{2n}$— (n being 2 or 3),

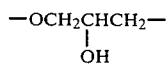

or —NC$_n$H$_{2n}$— (n being 2 or 3), and x— represents Cl—, Br—, I—, CH$_3$SO$_4$—, C$_2$H$_5$SO$_4$—, ½SO$_4$—— or CH$_3$COO— in the form of a sheet in an aqueous medium, wherein the weight ratio of acrylamide/cationic alkenyl monomer is within the range of 95/5 to 5/95, the improvement wherein polymerization is conducted in the presence of from 1 to 10,000 ppm based on the monomer of a water-soluble phosphite as a chain transfer agent.

2. The process according to claim 1, wherein the phosphite is at least one member selected from the group consisting of sodium phosphite, potassium phosphite and ammonium phosphite.

3. The process according to claim 1 or 2, wherein the cationic alkenyl monomer represented by the general formula (I) is a sulfate or hydrochloride of dimethylaminoethyl (meth)acrylate, diethylaminoethyl (meth)acrylate, 3-(dimethylamino)-2-hydroxypropyl (meth)acrylate or 3-(diethylamino)-2-hydroxypropyl (meth)acrylate, or a quaternized product of any of these monomers with an alkyl halide, benzyl chloride or dimethylsulfuric acid.

4. The process according to claim 1, wherein the cationic alkenyl monomer is a methacryloyloxyethyltrimethylammonium chloride or sulfate of dimethylaminoethyl methacrylate.

5. The process according to claim 1, wherein the weight ratio of acrylamide/cationic alkenyl monomer is within the range of 90/10 to 30/70 by weight.

6. The process according to claim 1, wherein a monomer copolymerizable with the acrylamide and the cationic alkenyl monomer is copolymerized in an amount of not more than 25% by weight of the whole monomer.

7. The process according to claim 6, wherein the copolymerizable monomer is methyl acrylate, acrylonitrile or hydroxyethyl methacrylate.

8. The process according to claim 1, wherein the thickness of the monomer solution layer at the time of polymerization is 3 to 50 mm.

9. The process according to claim 1, wherein the overall monomer concentration is 30% by weight or more.

10. The process according to claim 9, wherein the overall monomer concentration is 50 to 87% by weight.

* * * * *